United States Patent [19]

Williamson

[11] Patent Number: 5,115,550
[45] Date of Patent: May 26, 1992

[54] ADJUSTABLE O-RING PORT FITTING FOR A HYDRAULIC COUPLING

[75] Inventor: Nigel D. L. Williamson, Ecclesall, England

[73] Assignee: NWD International, Inc., Fort Wayne, Ind.

[21] Appl. No.: 533,124

[22] Filed: Jun. 5, 1990

Related U.S. Application Data

[63] Continuation-in-part of Ser. No. 293,392, Jan. 4, 1989, Pat. No. 4,934,742, which is a continuation-in-part of Ser. No. 148,846, Jan. 27, 1988, abandoned.

[51] Int. Cl.$^5$ .............................................. B23Q 3/00
[52] U.S. Cl. .................................... 29/283.5; 29/237; 29/510; 72/316; 285/39; 285/212; 285/89
[58] Field of Search ............... 285/212, 220, 332.2, 285/332.3, 918, 34, 89; 29/283.5, 237, 510; 72/316

[56] References Cited

U.S. PATENT DOCUMENTS

| | | | |
|---|---|---|---|
| 494,801 | 4/1883 | Weber . | |
| 587,347 | 8/1897 | Waite . | |
| 2,110,825 | 3/1938 | Archer | 285/332.3 |
| 2,118,670 | 5/1938 | Green | 247/18 |
| 2,187,217 | 1/1940 | Winslow | 285/157 |
| 2,452,890 | 11/1948 | Wolfram | 185/123 |
| 2,493,996 | 1/1950 | Parmesan | 285/122 |
| 2,523,995 | 9/1950 | Parmesan | 285/122 |
| 2,661,965 | 12/1953 | Parmesan | 285/122 |
| 2,696,395 | 12/1954 | Ellis | 285/120 |
| 2,960,353 | 11/1960 | Woodling | 285/220 X |
| 3,003,795 | 10/1961 | Lyon | 285/212 |
| 3,074,748 | 3/1961 | Ulrich | 285/347 |
| 3,151,896 | 10/1964 | Kody | 265/220 |
| 3,160,426 | 12/1964 | Faeser | 285/95 |
| 3,240,515 | 3/1966 | Schmohl | 285/212 |
| 3,273,917 | 9/1966 | Chakroff | 285/263 |
| 3,395,934 | 8/1968 | Rosan et al. | 285/23 |
| 3,850,456 | 11/1974 | Hanbuck et al. | 285/212 |
| 4,458,925 | 7/1984 | Raulins et al. | 285/332.2 |
| 4,458,926 | 7/1984 | Williamson | 285/332.2 |
| 4,489,963 | 12/1984 | Raulins et al. | 285/350 |
| 4,572,551 | 2/1986 | Jaquette | 285/355 |

FOREIGN PATENT DOCUMENTS 1086073 2/1955 France .

Primary Examiner—Dave W. Arola
Attorney, Agent, or Firm—Baker & Daniels

[57] ABSTRACT

The present invention is a hydraulic coupling and method of making the same. The coupling includes a male fitting, a female port, and a lock nut. The male fitting has external threads which receive the female port and the lock nut. The female port has an internal tapered recess for mating with an external tapered surface of the skirt of the lock nut. The skirt portion has inner and outer sections which initially form a double angle on the exterior surface. The outer section is bent inwardly to form a tapered external surface forming a steeper internal angle with the male fitting. An O-ring is positioned about the male fitting for sealing the hydraulic coupling within the tapered recess. The fitting of the present invention is also adaptable to the O.R.S. fitting and the S.A.E. flange fitting. A tapered surface of the female port engages an O-ring positioned in an annular groove of the male fitting.

6 Claims, 2 Drawing Sheets

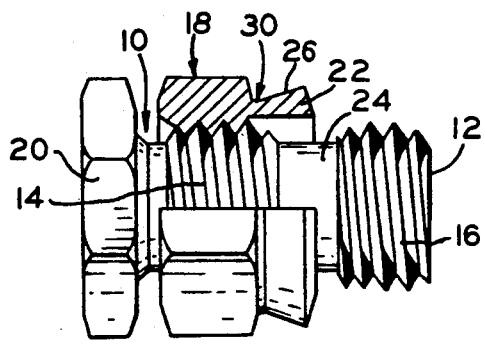
FIG_1
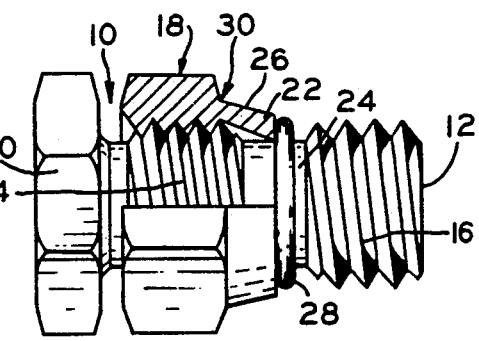
FIG_2
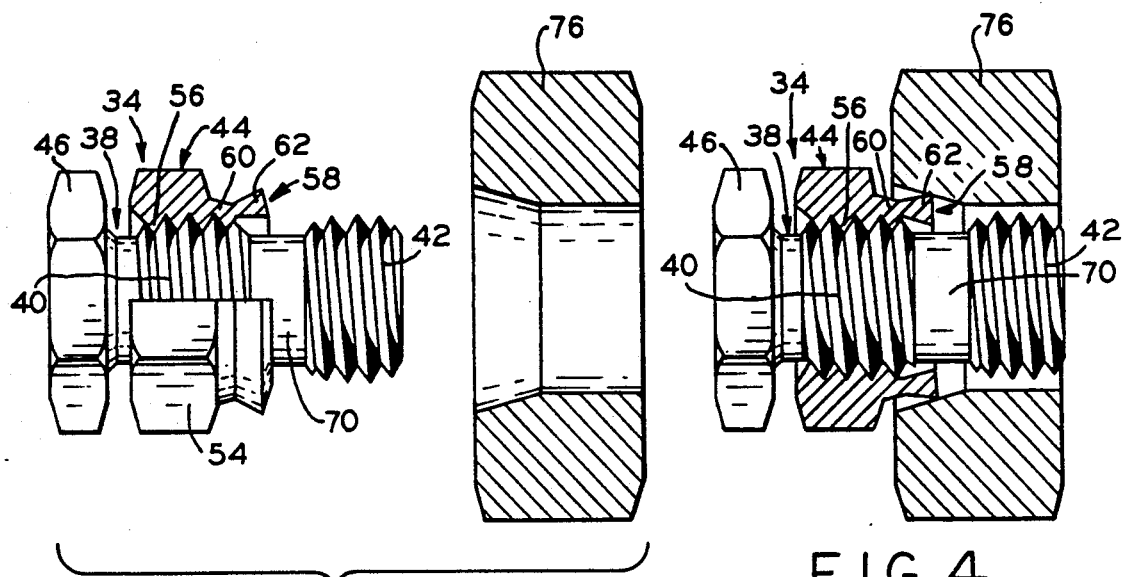
FIG_3
FIG_4
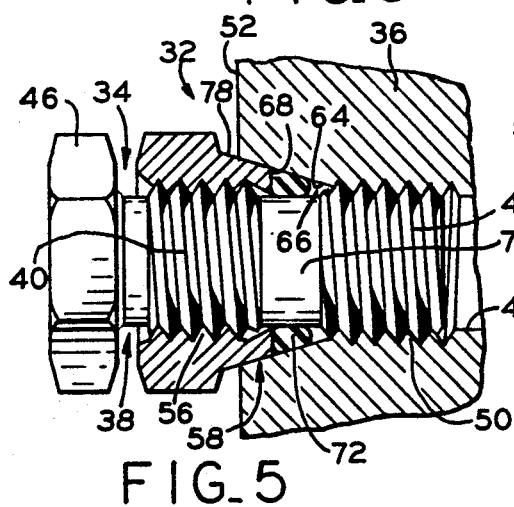
FIG_5
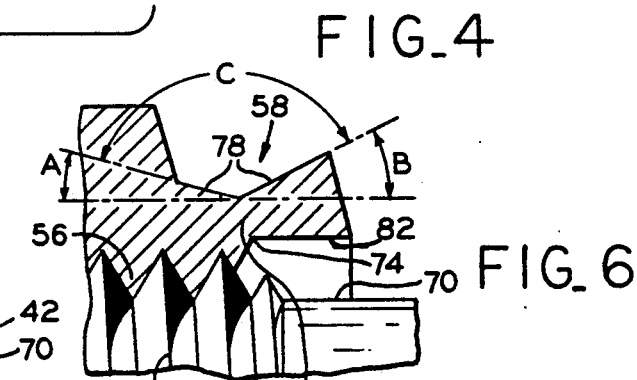
FIG_6
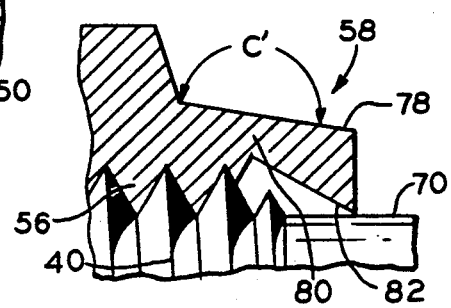
FIG_7

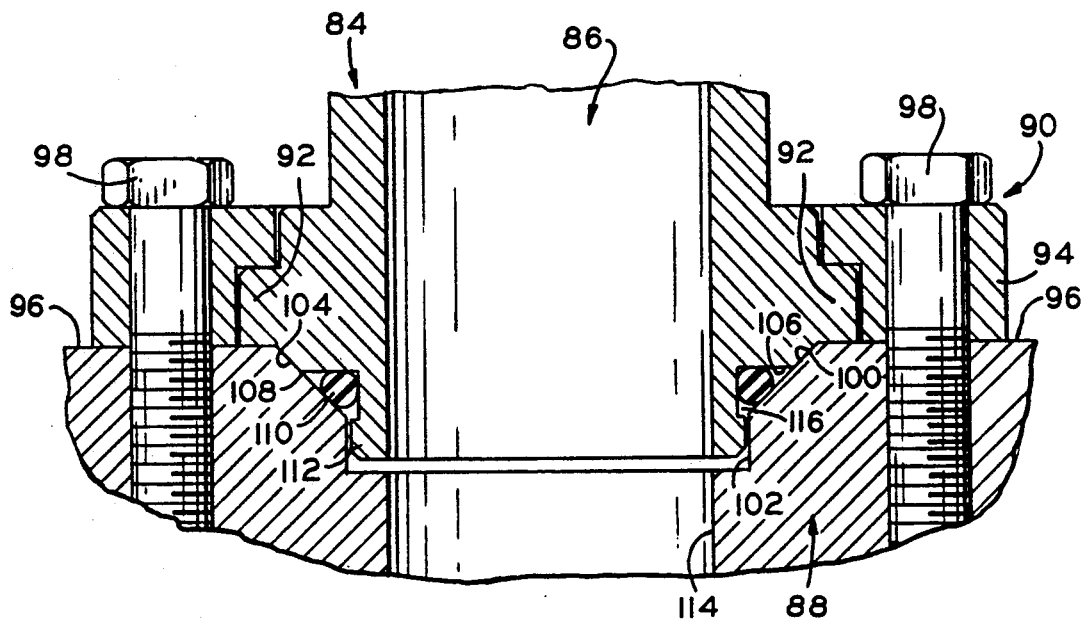
FIG_8
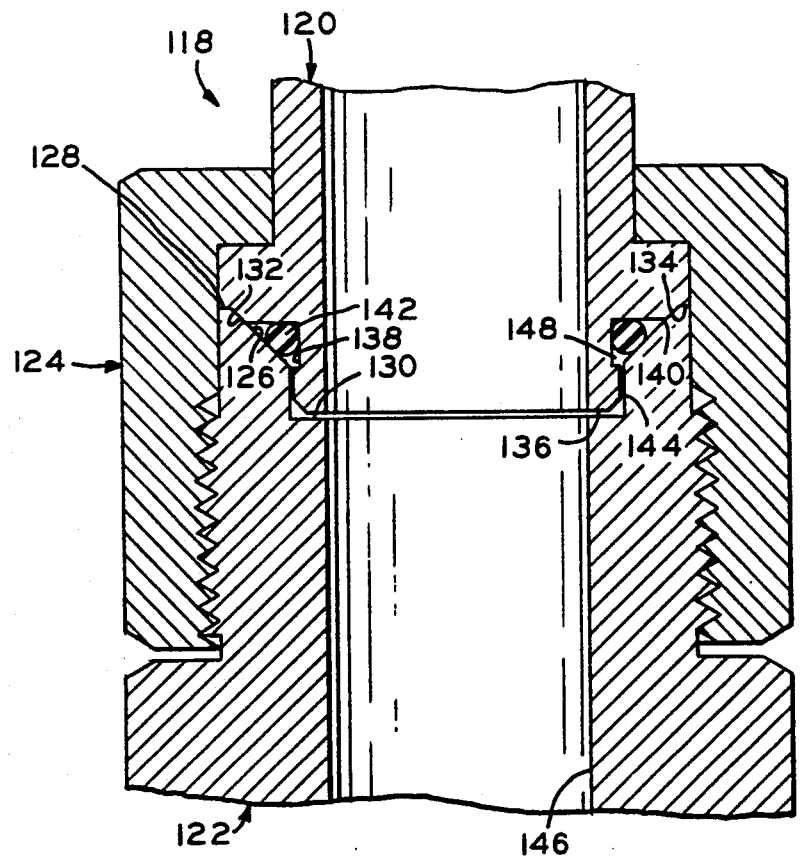
FIG_9

ADJUSTABLE O-RING PORT FITTING FOR A HYDRAULIC COUPLING

CROSS REFERENCE TO RELATED APPLICATIONS

This is a continuation-in-part of application Ser. No. 293,392, filed Jan. 4, 1989, now U.S. Pat. No. 4,934,742 which is a continuation-in-part of application Ser. No. 148,846, filed Jan. 27, 1988, now abandoned. Application 293,392 is explicitly incorporated by reference herein.

BACKGROUND OF THE INVENTION

The present invention relates to fluid couplings, and in particular the couplings which are used in high pressure hydraulic environments, as encountered on machine tools, agricultural and construction equipment, and the like.

For many years, the hydraulics industry has relied on hydraulic couplings for use in manifolds, pump housings, and control units that comply with the S.A.E J514 standard. These couplings utilize an O-ring, which are known in the industry as O-ring boss fittings. O-ring boss fittings are significantly better than the metal to metal couplings used elsewhere in hydraulic systems, and function well in lower pressure environments. However, current hydraulic applications utilize significant higher pressures, and the application of hydraulics to robotics and other environmentally sensitive applications dictates that all hydraulic couplings be leak free.

A major reason for the failure of certain prior art O-ring fittings is the rotational loosening of threads which occurs under conditions of high pressure and vibration. These conditions cause a gap between the back face of the hydraulic fitting and the front face of the hydraulic port to open up, which eventually leads to the O-ring material being extruded under pressure into the interface. As the fitting is screwed into the port, the O-ring is compressed and becomes, in all respects, another solid component, incapable of responding to pressure differentials within the interface area. Even in the case where the O-ring may not fill the entire space but fills a very high percentage of the space, the O-ring will be incapable of experiencing any significant axial movement and will function similarly to the case where the O-ring substantially fills the entire space.

As hydraulic pressure is exerted on the O-ring, it is urged outwardly and is extruded through a fitting gap. When the hydraulic pressure is subsequently released, the extruded portion of the O-ring is pinched by the abutting faces of the fitting and manifold as they settle back together. This occurs repeatedly upon application and relaxation of pressure, until failure eventually occurs. It is undesirable for the O-ring to be under high compressive forces, because this causes it to function as a packing material that is no capable of significant axial movement within the space.

Other prior art techniques have been attempted in an effort to provide improved hydraulic sealing. For example, the European industry has utilized bonded seals, which comprise a metal washer to which is bonded a rubber washer of special cross-sectional shape, wherein the metal washer provides a backup to the rubber seal. Although such bonded seals work effectively in many applications, they are relatively expensive to manufacture, and the seals are difficult to use, often resulting in poor assembly and subsequent field failure. Another attempted solution is the use of O-ring boss components which are made with additional threads, whereby the additional friction afforded helps to resist rotational loosening of the components. This is an additional cost, and has not proved to be as effective as industry demands. A further type of prior art seal comprises an O-ring having a resilient spring as its core covered with a softer outer layer. This type of O-ring is not readily deformable and is designed to seal by the action of radial forces from the interference fit between the O-ring and the surface between which it is seated.

In prior art fittings, the O-ring seal is typically located between the hydraulic fluid within the system and the threads of the hydraulic coupling, thereby exposing the threads to the ambient atmosphere. This leaves the threads exposed to possible corrosion by electrolytic action and atmospheric attack, thereby making it difficult to disconnect the coupling. Should this corrosion occur at the interface between the hydraulic conveyance system and the manifold to which it attaches, it would be impossible to disassemble the system for repair or maintenance without damaging expensive components, such as the pumps and controls into which the connecting ports are machined. The problem of thread corrosion can be eliminated by locating the threads in communication with the hydraulic fluid. However, a major reason for failure in service of an O-ring boss fitting is the loosening of the threads which occurs under conditions of pressure and vibration, and this situation is worsened by the lubrication of the threads by the hydraulic fluid in the system.

What is needed is a hydraulic coupling having an adjustable O-ring port fitting which allows for greater adjustment during the assembly of a hydraulic coupling.

SUMMARY OF THE INVENTION

The male fitting of the hydraulic coupling disclosed in the aforementioned patent application 293,392 includes a base and a lock nut having a skirt. The skirt extends into an O-ring pocket defined by the female fitting and the base. In forming the lock nut, the skirt is bent inwardly to match the internal taper of the female fitting.

However, certain disadvantages of this coupling exist. One problem involves the shallowness of the angle of the skirt portion relative to the axis of the male fitting. The deflection point of the bend is located at the end of the skirt abutting the main body of the lock nut, so the angle defined by the internal surface of the skirt and the axis of the base is relatively shallow. This shallowness limits the available undercut surface available for the lock nut to be adjusted during assembly of the hydraulic coupling. Another problem involves cracking of the skirt because of the bending, although the presence of cracks may not effect the functionality of the hydraulic coupling.

Having a skirt portion with a steeper internal angle relative to the axis of the base provides a solution to many of the aforementioned problems, but difficulty exists in manufacturing a lock nut with such a skirt. One method of manufacturing such a lock nut involves creating a die with a greater angle of deflection in a shorter space, but the skirt tends to bend outwardly when the angle is too steep.

The present invention relates to a hydraulic coupling having a lock nut including a skirt portion with a double angle on its external surface, which allows for using a die having a single angle which bends the skirt appropriately. The die of the present invention has an internal tapered surface for bending skirt portions and forming a mating tapered external surface. The cooperation of the double angle of the skirt and the internal angle of the die provide a reliable and cost-effective method for manufacturing lock nuts for male fittings of hydraulic couplings.

An advantage of the present invention is that the lock nut can travel a greater range on the undercut bearing surface of the base. The present invention provides a lock nut having a greater internal angle for its skirt portion, thereby minimizing the amount of external annular surface area covered by the skirt. With the arrangement of the present invention, greater flexibility is provided in assembling and securing a hydraulic coupling. An adequate adjustment space on the undercut bearing surface is provided by the present invention which is compatible with standard hydraulic equipment.

The present invention has its deflection point placed mid-way between the inner and outer points of the skirt, and the resultant internal angle between the skirt and the male fitting may be approximately double the angle formed by a skirt with a deflection at the annular edge of the skirt.

The present invention is, in one form, a method of forming a hydraulic coupling. The method comprises providing a male fitting including first external thread means, for threadedly engaging internal threads of a female fitting, and second external thread means, and providing a lock nut including internal thread means threadedly engaged with the second external thread means. The lock nut includes an annular skirt portion with an internal surface, and an annular undercut shoulder disposed between the first external thread means and the skirt portion. Further, the skirt portion includes an inner section and an outer section, with the inner section having a first external surface oriented at a first angle relative to the axis of the male fitting, and with the outer section including an internal surface oriented at a second angle relative to the axis of the male fitting. The inner and outer sections form a third external angle between them, and are located directly adjacent each other at a deflection point of the skirt portion. Next, the skirt portion is bent radially inward about the deflection point by pressing the outer section radially inward until the outer section abuts the male fitting and the third angle increases to substantially 180°.

It has been found the aforementioned type of fitting disclosed in application 293,392 can be adapted to existing O.R.S. and S.A.E. flange-type fittings. Therefore, another form of the present invention is a hydraulic coupling including a female fitting, a male fitting, an O-ring, and a connector. The female port has an outer face and an axial bore extending inwardly from the outer face and in communication with fluid under pressure. The bore also includes an annular internal tapered locking surface extending to its outer face. The male fitting has an end portion disposed within the bore, and an annular external tapered locking surface in tight contact with the internal tapered locking surface to form an interface. The male fitting also includes an annular undercut shoulder disposed between the end portion and the external tapered locking surface. The shoulder defines an annular O-ring pocket having a tapered corner where the interface extends into the pocket. The connector connects the female fitting and the male fitting. The O-ring is disposed in the pocket, and is of a durometer and size such that the O-ring is smaller in volume than the pocket thereby permitting the O-ring to move axially in the pocket and deform into sealing engagement with the tapered corner in response to fluid pressure. The internal tapered surface extends into the pocket past the O-ring.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 1 is a side elevational view, in partial cross section, of a hydraulic coupling, of the type disclosed in application 293,392, before bending the skirt portion;

FIG. 2 is a side elevational view, in partial cross section, of the hydraulic coupling of FIG. 1 after bending the skirt portion;

FIG. 3 is a side elevational view, in partial cross section, of a male fitting and die of the present invention before bending the skirt portion;

FIG. 4 is an engaged side elevational view, in partial cross section, of FIG. 3 showing the die pressing on the skirt portion;

FIG. 5 is a side elevational view, in partial cross section, of the hydraulic fitting of the present invention after bending the skirt portion, shown assembled to a threaded port;

FIG. 6 is an enlarged fragmentary view, in cross section, of the skirt portion of the present invention before bending;

FIG. 7 is an enlarged fragmentary view, in cross section, of the skirt portion of the present invention after bending.

FIG. 8 is a view, in an axial cross-section, of an S.A.E. flange coupling adapted to the hydraulic coupling of one embodiment of the present invention.

FIG. 9 is a view, in an axial cross-sectional, of an O.R.S. fitting adapted to the hydraulic coupling of one embodiment of the present invention.

Corresponding reference characters indicate corresponding parts throughout the several views. The exemplifications set out herein illustrate a preferred embodiment of the invention, in one form thereof, and such exemplifications are not to be construed as limiting the scope of the disclosure or the scope of the invention in any manner.

DETAILED DESCRIPTION OF THE PREFERRED EMBODIMENT

FIGS. 1 and 2 show a hydraulic coupling 8 which is disclosed in copending U.S. Pat. Application entitled HYDRAULIC COUPLING, Ser. No. 293,392, now U.S. Pat. No. 4,934,742. The disclosed hydraulic coupling 8 solves many of the aforementioned problems of the prior art. Male fitting 10 comprises a base portion 12 having threads 14 and 16, and having a lock nut 18 received on threads 14. Male fitting 10 is connected to a hydraulic hose or tube by means of a standard adapter 20.

Lock nut 18 includes a deformable skirt portion 22 and preferably has a slight diverging shape in radial cross-section. Skirt portion 22 extends into a tapered O-ring pocket formed by bearing surface 24 on base portion 12 and a tapered surface on the port (not shown)

to which it is connected. Skirt 22 includes an external annular surface 26 that preferably has the same degree of taper, or slightly less, as the surface of the port. To assemble the fluid coupling, lock nut 18 is first threaded onto base portion 12, and O-ring 28 is inserted onto bearing surface 24 formed in base portion 12. Then, base portion 12 is threaded into the bore of the port. Finally, lock nut 18 is threaded axially on male fitting 10 until annular surface 26 tightly abuts the locking surface of the port to form a tight face-to-face contact.

To provide the structure as shown in FIG. 2, skirt portion 22 of lock nut 18 of FIG. 1 is bent inwardly. This bending of skirt portion 22 is accomplished by pressing radially inward upon the skirt portion 22, thus angularly moving it about deflection point 30. Certain problems exist with the coupling of FIGS. 1 and 2.

One problem is created by the shallowness of the internal angle of the reformed skirt portion 22. This shallowness creates a restriction by coming into contact with the leading thread of thread 14 and limiting the available surface on undercut bearing surface 24 for adjustment of lock nut 18. To maintain an adjustment range similar to standard couplings, the length of bearing surface 24 must be increased which is a deviation from the industry standard. Compatibility with industry standard couplings is an important consideration for manufacturers and end users alike.

Another problem involves cracking of skirt portion 22 at deflection point 30 subsequent to deformation during assembly. This deformation is a part of the process which reforms the skirt portion 22 into a taper, thereby allowing it to intrude into the taper of the port. The presence of cracks in the deflection point of lock nut 18 is undesirable, although the cracks may ha little or no effect on the functionality of the hydraulic coupling.

The present invention is a hydraulic coupling 32 shown in FIG. 5 comprising a male fitting 34 and a female port 36. Male fitting 34 includes a base portion 38 having threads 40 and 42, and having lock nut 44 received on threads 40. Male fitting 34 is connected to a hydraulic hose or tube (not shown) by means of a standard adapter 46. Female port 36 includes an internal bore 48 having internal threads 50, and includes an outer face 52.

In accordance with an embodiment of the present invention, lock nut 44 includes a hexagonal exterior surface 54, internal threads 56, and an annular skirt portion 58 which is deformable and has inner and outer sections 60 and 62, respectively. The exterior surface of inner section 60 forms angle A with the axis of base portion 38; similarly, the exterior surface of outer section 62 forms angle B with the axis of base portion 38. Lock nut 44 is transformed from the configuration of FIG. 4 to that of FIG. 5 by bending skirt portion 58 about deflection point 74, which is located intermediate edge 68 and hexagonal surface 54. Outer section 62 is pressed axially inward by die 76 or other means (not shown) to cause skirt portion 58 to be deformed, as shown in FIGS. 3 and 4. Although one die pressing can sufficiently form skirt portion 58, in the preferred embodiment a first and second die 76 is pressed sequentially to form outer surface 78. The first and second dies for a particular diameter may have a different internal angle as described below. When fitting 32 is assembled, skirt portion 22 extends into the internal tapered locking surface 64 of female port 36. A tapered O-ring pocket 66 is defined by outer annular edge 68 of skirt portion 58, bearing surface 70 of male fitting 34, and internal tapered locking surface 64. O-ring 72 is located around bearing surface 70 and inside tapered O-ring pocket 66 to prevent leakage of any pressurized hydraulic fluid.

Specifically, as shown in FIG. 6, outer surface 78 has a double angle configuration consisting of the exterior surfaces of inner and outer sections 60 and 62, which forms obtuse angle C. Annular undercut shoulder 80 is disposed between threads 40 and interior surface 82 of skirt portion 34. Interior surface 82 initially may be approximately parallel with the axis of male fitting 34. To form the configuration shown in FIG. 7, outer section 62 is pressed axially inward by die 76 and deforms until surface 78 becomes straight, that is angle C' becomes approximately 180°, to form external tapered locking surface 78, preferably matching the angle of tapered locking surface 64. This allows the angle defined by interior surface 82 and the axial of male fitting 34 to be steeper than in the prior art, in the range of 25° to 50°, and preferably about 28° to 38°, depending on the size of the fitting. Table 1 presents internal angles for standard diameter nuts of the present invention, listed with the internal angles present in the prior version of application 293,392.

TABLE 1

| size (inches) | prior version | present invention |
| --- | --- | --- |
| ¼ | 20° | 35° |
| 5/16 | 22° | 38° |
| ⅜ | 20° | 32° |
| ½ | 20° | 30° |
| ⅝ | 17° | 28° |
| ¾ | 21° | 33° |
| 1 | 21° | 33° |
| 1¼ | 20° | 33° |
| 1½ | 20° | 30° |

In the ½" fitting, for example, the axial length of inner section 60 is 0.055 inches and the axial length of outer section 62 is 0.065 inches. The angle formed by inner section 60 of skirt portion 58 and the axis of lock nut 44 (angle A in FIG. 6) is 12°. The angle formed by outer section 62 of skirt portion 58 and the axis of lock nut 44 (angle B in FIG. 6) is 23°30'. A greater length of bearing surface 70 is available for positioning lock nut 44 and O-ring 72 with the arrangement of the present invention. Previously, in a ½ fitting with the 11° taper, only 0.086 inches were available for axial movement of lock nut 44, whereas with the present invention 0.122 inches are available. A further advantage of the double angle design is that the angle of die 76 need not be so steep so a to bend back skirt portion 58. Table 2 presents the angles of the first and second dies used for standard diameter nuts of the present invention.

TABLE 2

| size (inches) | first die angle | second die angle |
| --- | --- | --- |
| ¼ | 12° | 12° |
| 5/16 | 18° | 12° |
| ⅜ | 18° | 12° |
| ½ | 15° | 15° |
| ⅝ | 15° | 15° |
| ¾ | 18° | 15° |
| 1 | 15° | 15° |
| 1¼ | 18° | 15° |
| 1½ | 15° | 15° |

An advantage of the aforementioned method of forming the skirt of the lock nut is that cracking is virtually eliminated. With the design of the present invention, as the double angle of the original skirt is axially pressed inward, the movement of the deformed material in relation to the stationary material is easily accommodated by the material in question. The maximum diameter of the inner portion may be designed to be a few thousandths of an inch smaller that the break-out diameter of the die, thereby eliminating the tearing force previously applied at the deflection point in opposition to the hexagonal portion of the skirt.

Skirt portion 58 preferably has a hardness of about 121-127 brinell, which will permit it to deform inwardly when lock nut 44 is tightened, yet will not cause excessive deformation, which may reduce the effectiveness of the lock. Outer surface 78 preferably has the same degree of taper, or slightly less, as female tapered locking surface 64. The material for the fitting can be any number of materials currently in common use for hydraulic fittings, such as standard fitting brass, stainless steel, aluminum and mild steels, such as types 1144 or 12L14 leaded mild steel, and other suitable materials having a high tensile strength.

An alternative embodiment of the present invention compatible with the well known industry standard S.A.E. flange hydraulic coupling is depicted in FIG. 8. Hydraulic coupling 84 includes male fitting 86, female port 88, and fastener means 90. Male fitting 86 includes flange 92 which is engaged by annular clamp body 94 and held to outer face 96 of female port 88 -by bolts 98. The standard S.A.E. flange coupling is modified as described below.

In accordance with an embodiment of the present invention, female port 88 includes a tapered locking internal surface 100 which extends from face 96 to indented bore 102. External tapered locking surface 104 of male fitting 86 extends from flange 92 to groove 106, with corner 108 defined by adjacent surfaces 104 and the back face of groove 106 of male fitting 86. O-ring 110 is located within groove 106, and occupies a portion of groove 106 when the assembly of coupling 84 is clamped together. Also, annular extension 112 of male fitting 86 slides within indented axial bore 102 of female port 88 adjacent to inner axial bore 114. The interface of tapered locking surfaces 100 and 104, the interface of annular extension 112 and indented bore 102, and groove 106 define pocket 116 which receives O-ring 110.

The diameter of O-ring 110 is preferably smaller in diameter than the maximum diameter of pocket 116. O-ring 110 is capable of movement within pocket 116 so that it is able to easily move into shoulder 108 between tapered locking surface 104 and pocket 106 and then retract away from that corner when hydraulic pressure is released. The ratio of volume of pocket 116 that is not occupied by O-ring 110 ($V_p$) to the volume of O-ring 110 ($V_o$) is greater than about 0.4 and preferably is greater than about 0.5. For example, the ratio $V_p/V_o$ can be from about 0.5 to 0.9, and a preferred range of $V_p/V_o$ of about 0.55 to 0.82 has been found to be very effective in permitting O-ring 110 to move axially and seal against shoulder 108. Also, preferably the transverse cross-sectional dimension of the O-ring 110 should not be reduced to more than about 90% at the point of maximum distortion when the fittings are screwed together. O-ring 110 is described in detail in application 293,392.

Another alternative embodiment of the present invention, compatible with the well known industry standard O.R.S. hydraulic coupling, is depicted in FIG. 9. Hydraulic coupling 118 includes male fitting 120, female fitting 122, and fastener means 124. The standard O.R.S. hydraulic coupling is modified as described below.

In accordance with one embodiment of the present invention, female fitting 122 defines a port which includes a tapered locking internal surface 126 which extends from outer face 128 to inner face 130. External tapered locking surface 132 of male fitting 120 extends from inner face 134 to end 136 of fitting 120. Groove 138 interrupts surface 132, with corner 140 defined where surface 132 is adjacent to groove 138 of male fitting 120. O-ring 142 is located within pocket 148, and occupies a portion of groove 138 when the assembly of coupling 118 is completed. The interface of tapered locking surfaces 126 and 132, the interface of annular edge 144 and inner bore 146, and groove 13 define pocket 148 which receives O-ring 142. O-ring 142 has similar structural and material properties as the aforementioned O-ring 110 and functions similarly.

The preferred O.R.S. embodiment of the present invention is shown in FIG. 9, wherein hydraulic coupling 118 minimizes the material content and maximizes the thread lengths. However, another possible arrangement of the present invention which is adapted to the O.R.S. standard involves having the intruding portion with the external tapered surface on the threaded component and the receiving internal tapered surface on the unthreaded component.

While this invention has been described as having a preferred design, it can be further modified within the teachings of this disclosure. This application is therefore intended to cover any variations, uses, or adaptations of the invention following its general principles. This application is also intended to cover departures from the present disclosure as come within known or customary practice in the art to which this invention pertains and which fall within the limits of the appended claims.

What is claimed is:

1. A method of forming a male hydraulic coupling member adapted to form a hydraulic connection to a female port, comprising:

providing a male fitting member including first external thread means for threadedly engaging internal threads of a female port, and second external thread means, said male fitting member having a longitudinal axis;

providing a lock nut for frictionally locking the male fitting member to a port, the lock nut including internal thread means threadedly engaged with said second external thread means, said lock nut including an annular skirt portion extending toward said first external thread means and having an internal surface, and an annular undercut shoulder, said skirt portion including an axially inner section and an axially outer section, said inner section having a first external surface oriented at a first angle relative to the axis of said male member, said outer section including a second external surface oriented at a second angle relative to said axis of said male member and forming a third external angle with said first external surface less than 180° relative to said inner section external surface, said inner and outer sections located directly adjacent each other at a deflection point of said skirt portion; and bending said skirt portion radially inward about said deflection point until said outer section abuts said male member and said third angle increases to substantially 180°.

2. The method of claim 1 wherein said bending step includes orienting said internal surface of said skirt portion at an angle relative to the axis of said male member in the range of about 25° to about 50°.

3. The method of claim 1 wherein said bending step includes orienting said internal surface of said skirt portion at an angle relative to the axis of said male member in the range of about 28° to about 38°.

4. The method of claim 1 wherein said bending step includes forcing over said skirt portion with a die having an internal taper.

5. The method of claim 1 wherein said deflection point is located at an annular edge of said internal threaded surface.

6. The method of claim 1 wherein said first and second angles are acute and said third angle is obtuse prior to said bending step.

* * * * *